Patented Oct. 6, 1953

2,654,773

UNITED STATES PATENT OFFICE 2,654,773

TRI-ESTERS OF HYDROXY ALKYL THIO SUCCINIC ACIDS

Richard O. Zerbe, Nitro, W. Va., assignor to Monsanto Chemical Company, St. Louis, Mo., a corporation of Delaware No Drawing. Application July 22, 1949, Serial No. 106,319

14 Claims. (Cl. 260—470)

1

This invention relates to new and useful compositions of matter. More particularly it relates to tri-esters of hydroxy alkyl thio succinic acids of the general formula

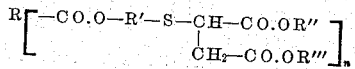

where R is an organic radical such as phenyl, tolyl, phenylene, naphthylene, butyl, amyl, ethylene, propylene, —CH=CH—, benzyl, cinnamyl, anisyl, xenyl, and the like; where R' is an alkylene group; and where R'' and R''' are like or unlike hydrocarbon groups comprising alkyl, aralkyl, and aryl groups. Examples of alkyl groups are methyl, ethyl, n-propyl, isopropyl, n-butyl, isobutyl, tert. butyl, amyl, hexyl, octyl, decyl and dodecyl. Examples of aralkyl groups are benzyl and phenethyl groups. An aryl group is illustrated by a phenyl group and where $n$ is an integer.

The new materials are readily prepared by esterifying the free hydroxy group of a hydroxy alkyl thio succinate under suitable conditions. Hydroxy alkyl thio succinates are prepared by the addition of a hydroxy substituted aliphatic mercaptan, such as mercapto ethanol, mercapto propanol, mercapto butanol, and the like, to maleic acid esters as described in Edward S. Blake's copending application Serial No. 742,468, filed April 18, 1947, now U. S. Patent 2,477,327.

As exemplary of the preparation of the new materials the following is illustrative and in nowise is to be considered limitative thereof.

Example 1

Substantially 114 parts by weight of dibutyl maleate and substantially 39 parts by weight of mercapto ethanol were intimately mixed in a suitable reaction vessel in the presence of 2.5 parts by weight of the catalyst sodium methylate. An exothermic reaction set in immediately and the temperature rose to 120° C. The contents of the reaction vessel were cooled below 100° C. and agitated for about one and one-half hours. Upon destroying the catalyst with dilute acid the organic layer was taken up with a water immiscible solvent and thereafter washed free of acid. The solution was then dried over anhydrous sodium sulfate and filtered through a bed of Attapulgus clay. Upon removal of the solvent approximately 147 (96% of theory) parts by weight of a colorless clear liquid believed to comprise the di-butyl ester of β-hydroxy ethyl thio succinic acid was obtained. On analysis the sulfur content was found to be 10.67 percent (theoretical sulfur content being 10.45 percent).

2

76.5 parts by weight of the above described dibutyl ester of β-hydroxy ethyl thio succinic acid was intimately mixed with approximately 35.15 parts by weight of benzoyl chloride in a reaction vessel equipped with a stirrer, thermometer, and reflux condenser and heated for 4 hours at 100°–105° C. The contents of the vessel were further heated for one-half hour at 150° C. and then vacuum was applied for one-half hour to assure removal of the hydrogen chloride by-product, retaining the temperature at 125°–150° C. Upon fractionating the resultant liquid product at reduced pressure (1 mm.) approximately 76.5% yield of an amber colored liquid soluble in ether, acetone, alcohol, benzene, chloroform, ethyl acetate, and believed to comprise the benzoylated dibutyl ester of β-hydroxy ethyl thio succinic acid was obtained. The structural formula of the new product is believed to be

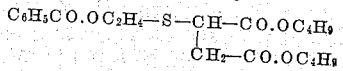

Example 2

Replacing di-butyl maleate of Example 1 with an equimolar amount of di-ethyl maleate and reacting in like manner with mercapto ethanol, 88.5% yield of a clear liquid product believed to comprise the di-ethyl ester of β-hydroxy ethyl thio succinic acid was obtained. On analysis the sulfur content was found to be 12.6 percent (theoretical sulfur content being 12.8 percent).

125 parts by weight of the above described diethyl ester of β-hydroxy ethyl thio succinic acid and approximately 70.2 parts by weight of benzoyl chloride were intimately mixed in a reaction vessel equipped with a stirrer, thermometer, and reflux condenser and heated for approximately two hours over a temperature range of 80°–150° C. Thereafter vacuum was applied to assure the removal of the hydrogen chloride by-product. Upon fractionating the resultant liquid product at reduced pressure (1 mm.) approximately 75.7 percent yield of an amber colored liquid soluble in most organic solvents and believed to comprise the benzoylated di-ethyl ester of β-hydroxy ethyl thio succinic acid was obtained. The structural formula of the new product is believed to be

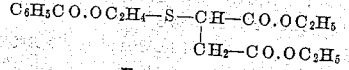

Example 3

Replacing di-butyl maleate of Example 1 with an equimolar amount of di-(2-ethyl hexyl) maleate and reacting in like manner with mercapto ethanol, a 96% yield of a clear liquid product believed to comprise the di-(2-ethyl hexyl) ester of β-hydroxy ethyl thio succinic acid was obtained. Upon analysis the sulfur content was found to be 7.5 percent (theoretical sulfur content being 7.65 percent).

104.5 parts by weight of the above described di-(2-ethyl hexyl) ester of β-hydroxy ethyl thio succinic acid and approximately 35.1 parts by weight of benzoyl chloride were intimately mixed in a reaction vessel equipped with a stirrer, thermometer, and reflux condenser heated for about two hours at 145°–150° C. Thereafter vacuum was applied to assure the removal of the hydrogen chloride by-product. Upon fractionating the resultant liquid product at reduced pressure (1 mm.) approximately 87.7 percent yield of a dark amber liquid soluble in most organic solvents and believed to comprise the benzoylated di-(2-ethyl hexyl) ester of β-hydroxy ethyl thio succinic acid was obtained. The structural formula of the new product is believed to be

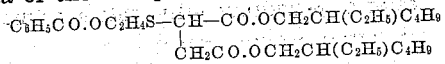

*Example 4*

Substantially one molecular proportion of the colorless clear liquid di-butyl ester of β-hydroxy ethyl thio succinic acid described in Example 1 was intimately mixed with substantially one-half of one molecular proportion of phthalyl chloride in a reaction vessel equipped with a stirrer, thermometer and a reflux condenser. While agitating the temperature was allowed to rise to 90° C. whereupon a vigorous evolution of hydrogen chloride was obtained. The contents of the vessel were further heated for one hour at 145° C.–150° C. and then vacuum was applied to assure removal of the hydrogen chloride by-product. Upon fractionating the resultant yellow syrupy crude product at reduced pressure approximately 79.1% yield of a pale amber colored liquid, soluble in most organic solvents and believed to comprise di-(β-ethyl thio dibutyl succinate) phthalate, was obtained. The structural formula of the new product is believed to be

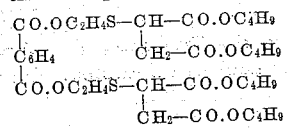

Employing other acid halides than benzoyl chloride and phthalyl chloride such as toluoyl chloride, xyloyl chloride, ethyl benzoyl chloride, isopropyl benzoyl chloride, trimethyl benzoyl chloride, phenyl benzoyl chloride, naphthoyl chloride, naphthalyl chloride, anisyl chloride, phenetyl chloride, phenylacetyl chloride, cinnamyl chloride, succinyl chloride and the like, in the above examples produce, respectively, the corresponding carboxylated di-esters of the hydroxy alkyl thio succinic acids. Other methods of esterification may be employed, as for example, esterifying the free hydroxyl group of the hydroxy alkyl thio succinates with a carboxylic acid or a carboxylic acid anhydride in the presence of a suitable catalyst, however, the acid halides are more effective.

The new compounds are soluble in most organic solvents and may be employed as plasticizers or softeners for such polymeric materials as polyvinyl chloride and butadiene-acrylonitrile copolymers. They have other uses also. A particularly useful group is the aroylated di-hydrocarbon esters of hydroxy alkyl thio succinic acids where the hydrocarbon groups are aliphatic groups containing not more than eight carbon atoms.

While the invention has been described with respect to several specific embodiments, variations and modifications may be resorted to, as for example, employing reaction temperatures and reaction times other than those disclosed in the above examples, without departing from the spirit or scope of the invention.

What is claimed is:

1. As a new composition of matter a compound of the structure

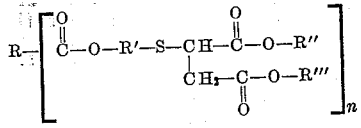

where R is hydrocarbon radical containing at least 2 but not more than 12 carbon atoms having a valence less than three, R' is an alkylene group of less than five carbon atoms, R'' and R''' are hydrocarbon groups containing less than 13 carbon atoms and n is an integer at least one but less than three.

2. As a new composition of matter a compound of the structure

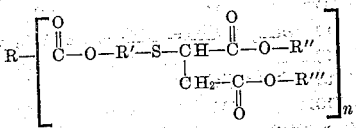

where R is an aryl hydrocarbon group containing at least 6 but not more than 12 carbon atoms having a valence less than three, R' is an alkylene group of less than five carbon atoms, R'' and R''' are hydrocarbon groups containing less than 13 carbon atoms and n is an integer at least one but less than three.

3. As a new composition of matter a compound of the structure

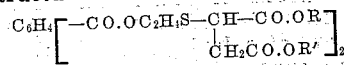

where R and R' are aliphatic hydrocarbon groups containing not more than eight carbon atoms.

4. As a new composition of matter a compound of the structure

C₆H₅CO.OC₂H₄—S—CHCO.OR
　　　　　　　　　　　|
　　　　　　　　　　CH₂CO.OR' where R and R' are aliphatic hydrocarbon groups containing not more than eight carbon atoms.

5. As a new composition of matter a compound of the structure

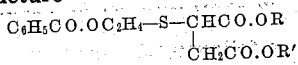

6. As a new composition of matter a compound of the structure

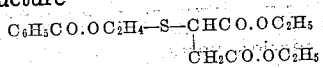

7. As a new composition of matter a compound of the structure

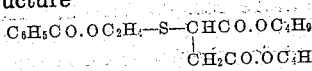

8. The method of making the composition of claim 1 which comprises condensing with removal of hydrogen chloride the acid chloride of a hydrocarbon carboxylic acid containing at least 3 but not more than 13 carbon atoms substituted by not more than two carboxyl groups and an hydroxyalkylthiosuccinate having not more than four carbon atoms in the hydroxyalkyl group and in which both carboxyl groups are esterified by hydrocarbon groups containing less than 13 carbon atoms.

9. The method of making the composition of claim 2 which comprises condensing with removal of hydrogen chloride the acid chloride of an aromatic hydrocarbon carboxylic acid in which the hydrocarbon group contains at least 6 but not more than 12 carbon atoms substituted by not more than two carboxyl groups and an hydroxyalkylthiosuccinate having not more than four carbon atoms in the hydroxyalkyl group and in which both carboxyl groups are esterfied by hydrocarbon groups containing less than 13 carbon atoms.

10. The method of making the composition of claim 3 which comprises condensing phthalyl chloride with β-hydroxy ethyl thio succinate wherein both carboxyl groups are esterified with aliphatic hydrocarbon groups containing not more than eight carbon atoms.

11. The method of making the composition of claim 4 which comprises condensing benzoyl chloride with β-hydroxy ethyl thio succinate wherein both carboxyl groups are esterified with aliphatic hydrocarbon groups containing not more than eight carbon atoms.

12. The method of making the composition of claim 5 which comprises condensing benzoyl chloride with the di-ethyl ester of β-hydroxy ethyl thio succinic acid.

13. The method of making the composition of claim 6 which comprises condensing benzoyl chloride with the di-butyl ester of β-hydroxy ethyl thio succinic acid.

14. The method of making the composition of claim 7 which comprises condensing benzoyl chloride with the di-octyl ester of β-hydroxy ethyl thio succinic acid.

RICHARD O. ZERBE.

References Cited in the file of this patent

UNITED STATES PATENTS

| Number | Name | Date |
|---|---|---|
| 2,345,006 | Ross et al. | Mar. 28, 1944 |
| 2,477,327 | Blake | July 26, 1949 |

FOREIGN PATENTS

| Number | Country | Date |
|---|---|---|
| 403,882 | Great Britain | Jan. 4, 1934 |